United States Patent
D'Alencon et al.

(10) Patent No.: US 9,574,148 B2
(45) Date of Patent: *Feb. 21, 2017

(54) FUEL ADDITIVE CONTAINING A DISPERSION OF IRON PARTICLES AND AN AMMONIUM POLYESTER DETERGENT

(75) Inventors: Lauriane D'Alencon, Paris (FR); Michael Lallemand, Saint Denis (FR); Virginie Harle, Senlis (FR); David J. Moreton, Belper (GB); Malcolm G. J. MacDuff, Belper (GB); Magali Pudlarz, Belper (GB); Hannah Greenfield, Belper (GB); Dean Thetford, Belper (GB); Joanne L. Jones, Belper (GB)

(73) Assignees: RHODIA OPERATIONS, Aubervilliers (FR); THE LUBRIZOL CORPORATION, Wickliffe, OH (US)

( * ) Notice: Subject to any disclaimer, the term of this patent is extended or adjusted under 35 U.S.C. 154(b) by 483 days.

This patent is subject to a terminal disclaimer.

(21) Appl. No.: 13/995,002

(22) PCT Filed: Dec. 19, 2011

(86) PCT No.: PCT/EP2011/073266
§ 371 (c)(1),
(2), (4) Date: Oct. 21, 2013

(87) PCT Pub. No.: WO2012/097937
PCT Pub. Date: Jul. 26, 2012

(65) Prior Publication Data
US 2014/0033604 A1    Feb. 6, 2014

(30) Foreign Application Priority Data
Dec. 22, 2010 (FR) .................................... 10 61063

(51) Int. Cl.
| | | |
|---|---|---|
| *C10L 1/224* | (2006.01) | |
| *C10L 1/12* | (2006.01) | |
| *B01J 13/00* | (2006.01) | |
| *C10L 1/10* | (2006.01) | |
| *C10L 10/06* | (2006.01) | |
| *C10L 1/16* | (2006.01) | |
| *C10L 1/188* | (2006.01) | |
| *C10L 1/198* | (2006.01) | |
| *C10L 1/222* | (2006.01) | |
| *C10L 1/238* | (2006.01) | |
| *C10L 1/2383* | (2006.01) | |
| *C10L 1/2387* | (2006.01) | |

(52) U.S. Cl.
CPC .......... *C10L 1/1208* (2013.01); *B01J 13/0026* (2013.01); *B01J 13/0034* (2013.01); *B01J 13/0047* (2013.01); *C10L 1/10* (2013.01); *C10L 1/224* (2013.01); *C10L 10/06* (2013.01); *C10L 1/1233* (2013.01); *C10L 1/1608* (2013.01); *C10L 1/1616* (2013.01); *C10L 1/1881* (2013.01); *C10L 1/198* (2013.01); *C10L 1/2225* (2013.01); *C10L 1/238* (2013.01); *C10L 1/2383* (2013.01); *C10L 1/2387* (2013.01)

(58) Field of Classification Search
USPC .............................. 44/354, 358, 363; 516/33
See application file for complete search history.

(56) References Cited

U.S. PATENT DOCUMENTS

| | | | |
|---|---|---|---|
| 3,778,287 A | 12/1973 | Frederick et al. | |
| 7,459,484 B2 * | 12/2008 | Blanchard et al. | 516/33 |
| 7,951,211 B2 * | 5/2011 | Barton et al. | 44/422 |
| 8,153,570 B2 * | 4/2012 | Barton et al. | 508/547 |
| 8,232,323 B2 * | 7/2012 | Thompson | 516/33 |
| 8,460,404 B2 * | 6/2013 | Hollingshurst | 44/422 |
| 8,961,623 B2 * | 2/2015 | Stevenson et al. | 44/422 |
| 9,045,709 B2 * | 6/2015 | Harle et al. | |
| 2005/0039382 A1 | 2/2005 | Blanchard et al. | |
| 2013/0239468 A1 * | 9/2013 | Greenfield et al. | 44/419 |
| 2014/0007494 A1 * | 1/2014 | D'Alencon et al. | 44/307 |
| 2014/0007495 A1 * | 1/2014 | D'Alencon et al. | 44/321 |
| 2014/0013659 A1 * | 1/2014 | D'Alencon et al. | 44/354 |

FOREIGN PATENT DOCUMENTS

| | | |
|---|---|---|
| EP | 1 512 736 A1 | 3/2005 |
| FR | 2 119 583 A5 | 8/1972 |
| FR | 2 833 862 A1 | 6/2003 |
| WO | 2008/116552 A1 | 10/2008 |
| WO | 2009/140190 A1 | 11/2009 |
| WO | 2010/012756 A1 | 2/2010 |

OTHER PUBLICATIONS

International Search Report, dated May 14, 2012, from corresponding PCT application.

* cited by examiner

*Primary Examiner* — Ellen McAvoy
(74) *Attorney, Agent, or Firm* — Young & Thompson

(57) ABSTRACT

A composition contains an additive for assisting with the regeneration of the PF in the form of an organic dispersion of iron particles and a detergent including a polyester quaternary ammonium salt.

26 Claims, No Drawings

FUEL ADDITIVE CONTAINING A DISPERSION OF IRON PARTICLES AND AN AMMONIUM POLYESTER DETERGENT

BACKGROUND OF THE INVENTION

Field of the Invention

The present invention relates to the association of an organic dispersion of iron particles and of a detergent within a composition notably useful as a fuel additive for internal combustion engines.

Description of the Related Art

During combustion of fuel and notably of gas oil in an engine, the carbonaceous products tend to form carbonaceous particles, which will be designated in the following of the description under the expression of "soots", which are said to be noxious both for the environment and for health. For a long time, there has been a search for techniques with which the emission of these soots may be reduced.

A satisfactory solution consists of introducing into the exhaust line a particle filter (or PF in the following of the text) which will block soots in its channels in order to let a gas escape without any soots. When a certain amount of accumulated soots in the PF is attained, the soots are burned in order to free the channels of the PF. This step for regenerating the PF is usually accomplished at greater temperatures than the temperature of the gas during normal operation of the engine, the soots usually burning in air at temperatures above 650° C.

In order to assist with regeneration of the PF, a catalyst is generally used which has the purpose of facilitating oxidation of the soots either directly or indirectly. By facilitating the oxidation of the soots is meant the fact of allowing their oxidation at a lower temperature so that this temperature is attained more frequently during normal operation of the engine. A portion of the soots may thus be continuously burned during the operation of the engine.

The catalyst also gives the possibility of lowering the temperature required for regenerating the PF so that the regeneration temperature is less than the combustion temperature of the soots without the presence of said catalyst. The catalyst also allows acceleration of the oxidation rate of the soots which allows a reduction in the required time for regenerating the PF.

The use of an additive for assisting with regeneration of the PF, vectorized by the fuel feeding the engine or further a fuel borne catalyst (FBC), proved to meet many criteria since it allows regeneration of the PF more rapidly and at a lower temperature than the competing technology called catalyzed soot filter (CSF, the catalyst being immobilized in the PF), which contributes to reducing fuel consumption for regenerating the PF (and thus reducing $CO_2$ emissions).

New engine technologies, such as diesel engines with a common-rail system and high pressure direct fuel injection, are performing but however sensitive to fuel quality. It is notably known that deposits may notably form in injectors of diesel engines during their operation. The amount of deposit and their rate of formation depend on the quality of the fuel used in the engine but also on the nature of the fuel additives present in the latter.

By <<fuel additive>> is meant here any additive allowing improvement in the distribution of the fuel in the engine and/or improvement in the operating performances of the engine and/or improvement in the operating stability of the engine over time. Fuels which contain unstable components, like fatty acid methyl esters generally present in biofuels, tend to form more deposit than mineral fuels not containing any of them.

Further, the presence of certain metals in fuels like copper or zinc may lead to increased amounts of deposit and thus to exacerbated fouling levels of the injectors. The metals present in fuels stem from various origins like the metals stemming from the contact between the fuel and the fuel distribution network or from any other contamination. Metals may also be deliberately introduced into the fuel like in the case of metal additives for assisting regeneration of the PF. Even if these additives are beneficial for regeneration of the PF and are thus desirable, some may promote the formation of deposit in the fuel circuit and most particularly in fuel injectors.

Deposits may lead to a loss of power of the engine and may possibly go all the way to damaging the engine. These deposits may also degrade the quality of the combustion in the cylinders and lead to an increase in polluting emissions and in engine fuel consumption. It is known that detergent additives reduce or suppress formation of deposit in the injectors.

Among fuel additives for assisting with the regeneration of the PF, dispersions of rare earths, notably based on cerium, and/or iron are known to be efficient for regenerating the PF and contribute to the reduction of the oxidation temperature of the soots. These dispersions should have good dispersibility, high stability over time and sufficient catalytic activity at a relatively not very high concentration in the fuel into which they are introduced.

The dispersions known to this day do not always meet all these criteria. They may have for example good dispersibility but not sufficient stability, notably when they are introduced into fuels containing fatty acid methyl esters or another easily oxidizable fuel of vegetable origin. These dispersions may be sufficiently stable but may have catalytic activity at too high metal concentrations for them to be economically of interest. Moreover, as indicated earlier, all these dispersions should have a limited impact on the operation of fuel injectors, notably to lead to limited fouling of the latter, even in the presence of a fuel containing biofuel or further a fuel containing metals. Further the presence of an FBC in the fuel may lead to a reduction in the oxidation resistance of the fuel, notably when it contains biofuels.

SUMMARY OF THE INVENTION

Therefore, it is sought to provide compositions comprising an additive for assisting regeneration of the PF with good stability and which lead to low fouling of the injectors and to a limited reduction in the oxidation resistance of the fuel, notably in the presence of a biofuel.

Preferably it is sought to provide compositions comprising an additive having sufficient catalytic activity at a relatively not very high concentration.

An object of the invention is to provide a well-adapted composition for this type of use.

For this purpose, the invention proposes a composition containing an additive for assisting regeneration of the PF in the form of an organic dispersion of iron particles and of a detergent comprising a quaternary ammonium salt.

The dispersion comprises particles of an iron compound of small size and at least one amphiphlic agent.

In certain cases, the detergent may further additionally include an oxygenated detergent.

The invention also provides an additived fuel comprising a fuel and the composition described earlier.

More specifically, the invention relates to a composition comprising a dispersion and a detergent comprising a polyester quaternary ammonium salt, said dispersion comprising:

an organic phase;
at least one amphiphlic agent, and
particles dispersed in the organic phase, of colloidal dimensions, consisting of an iron compound.

DETAILED DESCRIPTION OF THE INVENTION

The Organic Dispersion

The particles dispersed in the dispersions of the invention are individualized solid particles of colloidal dimensions or aggregates of such particles. Said particles may further optionally contain residual amounts of bound or adsorbed ions such as sodium ions, nitrate ions or ammonium ions.

By colloidal dimensions, are meant dimensions comprised between about 1 nm and about 200 nm. The particles may more particularly have an average size of at most 100 nm, preferably at most 20 nm and still more preferentially at most 15 nm. It will be noted that in such dispersions, the compound of the additive may either be preferably found totally as colloids, or as colloids and partly as ions.

The grain size discussed above is determined by transmission electron microscopy (TEM), in a standard way, on a sample dried beforehand and deposited on a carbon membrane supported on a copper grid.

The dispersion of the composition of the invention is a dispersion in an organic phase.

For this purpose, most often, the organic phase consists of at least 80%, preferably at least 90%, preferably at least 95% by mass of an organic solvent or of a mixture of organic solvents, based on the total mass of the organic phase.

The organic phase optionally only consists of an organic solvent or a mixture of organic solvents.

This organic phase is selected notably according to the use of the dispersion.

As an example of an organic phase, mention may be made of aliphatic hydrocarbons such as hexane, heptane, octane, nonane, cycloaliphatic hydrocarbons such as cyclohexane, cyclopentane, cycloheptane, aromatic hydrocarbons such as benzene, toluene, ethylbenzene, xylenes, liquid naphthenes. Petroleum cuts of the Isopar or Solvesso (registered trademark by EXXON) type, notably Isopar L or Solvesso 100 which essentially contains a mixture of methyl ethyl and trimethyl benzene, Solvesso 150 which contains a mixture of alkylbenzenes, in particular dimethyl benzene and tetraethyl benzene, are also suitable. The organic phase may also consist of a petroleum cut.

It is also possible to apply for the organic phase, polar chlorinated hydrocarbons such as chloro- or dichloro-benzene, chlorotoluene. Ethers as well as aliphatic and cycloaliphatic ketones such as for example diisopropyl ether, dibutyl ether, methylisobutylketone, diisobutylketone, mesityl oxide, may be contemplated.

It is also possible to contemplate polar solvents based on alcohol such as 2-ethylhexanol.

The organic phase may also advantageously be based on an apolar hydrocarbon notably like aliphatic hydrocarbons.

In this preferred category, mention may be made of petroleum cuts of the Isopar type essentially containing isoparaffinic and paraffinic $C_{11}$ and $C_{12}$ hydrocarbons.

The dispersion according to the invention includes at least one amphiphilic agent.

This amphiphilic agent has the effect of stabilizing the dispersion of particles. It is also used as a phase transfer agent during the preparation of the dispersions (between the aqueous phase and the organic phase).

Preferably, the amphiphilic agent is a carboxylic acid which generally includes from 10 to 50 carbon atoms, preferably from 10 to 25 carbon atoms.

This acid may be linear or branched. It may be selected from aryl, aliphatic or arylaliphatic acids optionally bearing other functions provided that these functions are stable in the media which are desirably used for the dispersions according to the present invention.

Thus, it is possible to apply for example aliphatic carboxylic acids which are natural or synthetic. Of course, it is possible to use acids in a mixture.

As an example, mention may be made of fatty acids of tallol, soya bean, tallow oil, flax oil, oleic acid, linoleic acid, stearic acid and its isomers, pelargonic acid, capric acid, lauric acid, myristic acid, dodecylbenzenesulfonic acid, ethyl-2-hexanoic acid, naphthenic acid, hexanoic acid.

As a preferred amphiphlic agent, mention may be made of stearic acid and of its isomers such as for example a mixture of acids or products which contain chain length distributions like Prisorine 3501 from Croda.

This amphiphlic agent may also consist of one or several polyacids such as succinic acids substituted with polybutenyl groups. These polyacids may be used alone or in combination with one or several aliphatic monocarboxylic acids containing between 10 and 20 carbon atoms on average.

As an example, mention may be made of the mixture of oleic acid with one or several succinic acids substituted with polybutenyl groups, in which the polybutenyl groups have an average molecular weight (measured by gas chromatography) comprised between 500 and 1,300 and more particularly between 700 and 1,000 g·mol$^{-1}$.

According to a first embodiment of the invention, the dispersion of the composition comprises particles consisting of an iron compound in the amorphous form.

Dispersions of iron particles of this type are for example described in WO 2003/053560. Reference may therefore be made to the whole of the description of this document. The characteristics of the dispersions which are described therein will be recalled below.

In these dispersions, the amorphous nature of an iron compound may be shown by X-ray diffraction analysis (or XRD), the X-ray diffraction diagrams obtained do not actually show any significant peak load characteristic of a crystalline phase of iron.

According to an alternative of this dispersion, at least 85%, more particularly at least 90% and even more particularly at least 95% of the particles are primary particles. By primary particle is meant a particle which is perfectly individualized and which is not aggregated with another or several other particles. This characteristic may be shown by examining the dispersion with TEM.

The cryo-TEM technique may also be used for determining the aggregation state of elementary particles. It gives the possibility of observing by transmission electron microscopy (TEM) samples kept frozen in their natural medium which is either water or organic diluents such as aromatic or aliphatic solvents such as for example Solvesso and Isopar or else certain alcohols such as ethanol.

The freezing is carried out on thin films with a thickness from about 50 nm to 100 nm either in liquid ethane four aqueous samples or in liquid nitrogen for the other ones.

With cryo-TEM, the dispersion state of the particles is well preserved and representative of the one present in the real medium.

The particles of this same colloidal dispersion may have a fine grain size. Indeed they have a $\phi_{50}$ comprised between 1 nm and 5 nm, more particularly between 3 nm and 4 nm.

The number median diameter $\phi_{50}$ is the diameter such that 50% of the particles counted on the TEM micrographs have a smaller diameter than this value, and 50% of the counted particles have a larger diameter than this value.

According to a second embodiment of the invention, the dispersion of the composition comprises particles consisting of an iron compound in the crystallized form.

A dispersion of iron particles in the crystallized form may be prepared according to a method including the following steps:

a) putting into contact in an aqueous phase, a base and a mixture comprising an Fe(II) salt and an Fe(III) salt according to a molar ratio Fe(II)/Fe(III) comprised from 0.45 to 0.55, preferably about equal to 0.5, advantageously equal to 0.5, by maintaining the pH of the aqueous phase at a pH value of more than 8, whereby a precipitate is obtained; and b) putting into contact the thereby obtained precipitate, optionally separated from the aqueous phase, with an organic phase, in the presence of an amphiphilic agent, whereby the dispersion is obtained in an organic phase.

This crystallized form, which may be obtained by applying the steps of the aforementioned method, may notably be observed by the X-ray diffraction technique (XRD) which shows peaks characteristic of at least one defined crystallized structure of iron.

The particles of the dispersion of the invention are in the form of individualized particles or aggregates of such particles, of an iron compound, the composition of which essentially corresponds to an iron oxide in crystallized form.

The crystallized forms of iron oxide making up the particles according to the invention are typically Fe(III) oxides of the maghemite ($\gamma$-$Fe_2O_3$) type and/or Fe(II) and Fe(III) oxides of the magnetite ($Fe_3O_4$) type.

The aforementioned method generally gives the possibility of obtaining particles based on Fe(III) oxide of the maghemite type and/or Fe(II) and Fe(III) oxide of the magnetite type, the magnetite may then be oxidized into Fe(III) oxide of the maghemite type, for example upon contact with oxygen.

Preferably, according to a particular alternative of this second embodiment, the particles with a size greater than or equal to 4 nm in the dispersion are, for at least 90% of them, in the form of an iron compound in crystallized form, advantageously at least 95%, preferentially at least 99%.

According to another feature of this second embodiment, the average size $\overline{D}_{XRD}$ as measured by XRD of the particles of the dispersion is less than or equal to 12 nm.

Preferably, according to this second embodiment, the average size $\overline{D}_{XRD}$ as measured by XRD of the particles of the dispersion is less than or equal to 8 nm, preferably less than or equal to 7 nm, preferentially less than or equal to 6 nm and advantageously less than or equal to 5 nm.

Generally this size is of at least 4 nm.

The crystallized nature of the particles according to this second embodiment may notably be detected by XRD analysis. The XRD diagram allows the definition of two characteristics of these particles:

the nature of the crystalline phase: the position of the measured diffraction peaks as well as their relative intensity are characteristic of the magnetite or maghemite phase, the crystalline phase then corresponding to the sheet ICDD 01-088-0315; and the average size $\overline{D}_{XRD}$ of crystallites (or crystallized domains): this size is calculated from the width at half-height of the diffraction peak of the crystallographic plane (440) of maghemite/magnetite:

$$\overline{D}_{XRD} = \frac{k \cdot \lambda}{\sqrt{H^2 - s^2} \cdot \cos\theta}$$

with:

$\lambda$: wavelength=1.54 Å, k: form factor equal to 0.89,

H: total width at half-height of the relevant line, expressed in degrees, s: instrumental width at the angle 0 as determined by $LaB_6$ analysis=0.072°, $\theta$ diffraction angle (in radians) of the diffraction peak (440) of magnetite and/or maghemite=0.547 rad.

The XRD analysis may for example be carried out on a commercial apparatus of the X'Pert PRO MPD PANalytical type, notably consisting of a $\theta$-$\theta$ goniometer, allowing characterization of liquid samples. The sample remains horizontal during the acquisition and it is the source and the detector which move.

This installation is driven by the X'Pert Datacollector software package provided by the supplier and utilization of the obtained diffraction diagrams may be performed by means of the X'Pert HighScore Plus software package, version 2.0 or above (supplier: PANalytical).

Regardless of its embodiments, according to a preferential feature of the invention, it is preferable that the essential of the particles, i.e. at least 80% by number, have a size $D_{TEM}$ of less than or equal to 12 nm, more particularly less than or equal to 8 nm, preferably less than or equal to 7 nm, preferentially less than or equal to 6 nm.

Typically, at least 90% and more particularly at least 95% of the particles have a size $D_{TEM}$ of less than or equal to the aforementioned values.

This size $D_{TEM}$ may be detected by analyzing the dispersion with transmission electron microscopy (TEM), used in an imaging mode with which the particles may be viewed at high magnification and their size may be measured.

Preferably, and for better accuracy of the measurement of the size of the particles, it is possible to proceed according to the following procedure.

The dispersion according to the invention is diluted beforehand by its solvent so as to obtain an iron mass content of about 0.035%. The thereby diluted dispersion is then placed on an observation grid (like a carbonaceous polymeric membrane supported on a copper grid) and the solvent is evaporated.

For example it is possible to use a transmission electron microscope giving access to magnifications ranging up to 800,000, the acceleration voltage being preferably selected equal to 120 kV.

The principle of the method consists of examining under the microscope various regions (about 10) and of measuring the dimensions of 250 particles, by considering these particles as spherical particles. A particle is estimated as being identifiable when at least half of its perimeter may be defined. The size $D_{TEM}$ then corresponds to the diameter of the circle properly reproducing the circumference of the particle. Identification of the particles which may be utilized, may be accomplished by means of a software package such as ImageJ, Adobe Photoshop or Analysis.

A cumulated grain size distribution of the particles is inferred therefrom, which is grouped into 40 grain size classes ranging from 0 to 20 nm, the width of each class being 0.5 nm. The number of particles in each class or for each $D_{TEM}$ is the basic datum for representing the number differential grain size distribution.

Further, the particles of the dispersion of the invention preferably have a fine grain size as observed by TEM, whether they are based on an iron compound in the amorphous or crystallized form.

The particles of the dispersion according to the second embodiment of the invention have a median diameter $\phi_{50}$ preferably comprised between 3 nm and 12 nm, more particularly between 4 nm and 10 nm.

The number median diameter $\phi_{50}$ is the diameter such that 50% of the particles counted on the TEM micrographs have a smaller diameter than this value, and 50% of the counted particles have a larger diameter than this value.

The particles according to the invention preferably have a polydispersity index $P_n$ comprised from 0.1 to 0.5.

This polydispersity index $P_n$ is calculated from the number grain size distribution determined by TEM according to the following formula:

$$P_n = \frac{\Phi_{84} - \Phi_{16}}{2 \cdot \Phi_{50}}$$

$\phi_{16}$ being the diameter for which 16% of the particles have a diameter of less than this value, and $\phi_{84}$ being the diameter for which 84% of the particles have a diameter of less than this value.

The particles according to the invention meeting this criterion have good monodispersity.

The dispersion state of the solid objects may be characterized by dynamic light scattering (DLS), further called quasi-elastic light scattering (QELS), or further photon correlation spectroscopy. This technique allows measurement of a hydrodynamic diameter $D_h$ of the solid objects, the value of which is highly affected by the presence of aggregates of particles.

According to a preferential characteristic of the invention, the solid objects of the invention have a hydrodynamic diameter $D_h$ of less than or equal to 50 nm, preferably less than or equal to 30 nm, preferentially less than or equal to 20 nm, advantageously less than or equal to 16 nm, as measured by dynamic light scattering (DLS).

The hydrodynamic diameter $D_h$ of the solid objects of a dispersion according to the invention may be measured on the dispersion of the invention, after dilution of the latter by its solvent so as to attain an iron concentration comprised from 1 to 4 g·L$^{-1}$.

A light scattering apparatus of the ALV CGS 3 (Malvern) apparatus provided with an ALV series 5,000 correlator and with an ALV Correlator software package V3.0 or above. This apparatus uses the so-called «Koppel cumulants» data processing method, which gives the possibility of accessing the value of the hydrodynamic diameter $D_h$.

It is important to conduct the measurement at the temperature (typically 25° C.) corresponding to the viscosity values and to the refractive index values used for the solvent in the calculation of the hydrodynamic diameter and to use a measurement angle typically set to 90°.

It is also recommended to carry out the preparations of the dilution as well as the handling operations under a laminar flow hood in order to avoid contamination of the samples by dust and distort the measurement.

It is considered that the experimental data are validated if the scattered intensity is stable and if the autocorrelation function is without any abnormalities.

Finally, the scattering intensity should be comprised within limits defined for each apparatus.

This preferred characteristic of the objects of the dispersion increases its stability. The individualized nature of the particles also increases the global contact surface area available between the latter and the soots and thus contributes to improving the catalytic activity of the dispersion according to the invention.

According to a particular embodiment of the invention, the dispersion (DSP1) of the composition according to the invention comprises:
    an organic phase;
    at least one amphiphlic agent, and
    solid objects dispersed in the organic phase, as individualized particles or aggregates of particles, consisting of an iron compound in crystallized form, such that:
        said particles have an average size $\overline{D}_{DRX}$ of less than or equal to 7 nm as measured by X-ray diffraction (XRD);
        at least 80% by number of said particles have a size $D_{TEM}$ of less than or equal to 7 nm as measured by transmission electron microscopy (TEM).

The solid objects of this dispersion (DSP1) may preferably have a hydrodynamic diameter $D_h$ of less than or equal to 30 nm, as measured by dynamic light scattering (DLS).

According to another particular embodiment of the invention, the dispersion of the composition (DSP2) according to the invention comprises:
    an apolar organic phase;
    at least one amphiphilic agent, and
    solid objects dispersed in the organic phase as individualized particles or particle aggregates, consisting of an iron compound in crystallized form, such that:
        said solid objects have a hydrodynamic diameter $D_h$ less than or equal to 30 nm as measured by dynamic light scattering (DLS);
        said particles have an average size $\overline{D}_{XRD}$ of less than or equal to 7 nm as measured by X-ray diffraction (XRD); and
        at least 80% by number of said particles have a size $D_{TEM}$ of less than or equal to 7 nm as measured by transmission electron microscopy (TEM).

The preferential or more particular values of the parameters $\overline{D}_{XRD}$, $D_h$, $D_{TEM}$ as well as of the diameter $\phi_{50}$ and of the index $P_n$ given above are also applied here for the dispersions DSP1 and DSP2 insofar that these values also verify the limits given above in the list of the characteristics of DSP1 and DSP2.

The dispersions according to the invention have an iron compound mass concentration which may be of at least 2%, more particularly of at least to 5%, this concentration being expressed in iron metal based on the total mass of the dispersion.

This concentration may generally range up to 20%.

The iron content may be determined by any technique known to one skilled in the art such as by the measurement with X fluorescence spectroscopy directly applied onto the dispersion according to the invention.

A dispersion of iron particles in crystallized form may be prepared according to a method including the following steps:

a) putting into contact in an aqueous phase a base and a mixture comprising an Fe(II) salt and an Fe(III) salt according to a molar ratio Fe(II)/Fe(III) comprised from 0.45 to 0.55, preferably about equal to 0.5, advantageously equal to 0.5, by maintaining the pH of the aqueous phase at a pH value of more than 8, whereby a precipitate is obtained; and b) putting into contact the thereby obtained precipitate, optionally separated from the aqueous phase, with an organic phase based on an organic solvent, in the presence of an amphiphlic agent, whereby the dispersion is obtained in an organic phase.

In step a) of the method, a base and a mixture comprising an Fe(II) salt and an Fe(III) salt according to a molar ratio (Fe(II)/Fe(III) comprised from 0.45 to 0.55, preferably about equal to 0.5, advantageously equal to 0.5, are put into contact in an aqueous phase, typically an aqueous solution of the base and of the iron salts.

As a base, it is possible to notably use compounds of the hydroxide type. Mention may be made of alkaline or earth alkaline hydroxides and ammonia. It is also possible to use secondary, tertiary or quaternary amines.

As an iron salt, it is possible to use any water-soluble salt. As an Fe(II) salt, mention may be made of ferrous chloride $FeCl_2$. As an Fe(III) salt, mention may be made of ferric nitrate $Fe(NO_3)_3$.

During step a), the reaction occurring between the Fe(II) salt, the Fe(III) salt and the base is generally accomplished under conditions such that the pH of the formed reaction mixture remains greater than or equal to 8 upon putting into contact the iron salts and the base in the reaction medium.

Preferably, during step a), the pH of the reaction mixture is maintained at a value greater than or equal to 8. This pH value is typically comprised between 9 and 13.

The putting into contact of the iron salts and of the base in an aqueous phase may be accomplished by introducing a solution of the iron salts into a solution containing the base, for which the pH is of at least 8. It is also possible to introduce the iron salts and the base in a solution containing salts, at a concentration typically less or equal to 3 $mol \cdot L^{-1}$, such as for example sodium nitrate, and for which the pH is adjusted beforehand to a value greater than or equal to 8. It is possible to continuously achieve the contacting, the pH condition being fulfilled by adjusting the respective flow rates of the solution of the iron salts and of the solution containing the base.

It is possible, according to a preferred embodiment of the invention, to operate under conditions such that during the reaction between the iron salts and the base, the pH of the aqueous phase is maintained constant. By maintaining the pH constant, is meant a variation of the pH of ±0.2 pH units relatively to the set value. Such conditions may be obtained by addition, during the reaction between the iron salts and the base, for example upon introducing the solution of the iron salts into the solution of the base, of an additional amount of base into the aqueous phase.

Within the scope of the present invention, the inventors have observed that the size of the particles may be modulated depending on the pH at which is maintained the aqueous phase. Typically, and without intending to be bound to a particular theory, the size of the particles is all the smaller since the pH of the aqueous phase is high.

For the particular embodiments of the invention mentioned above and corresponding to the dispersions DSP1 and DSP2, the pH value for step a) is at least 11.5, more particularly at least 12.

The reaction of step a) is generally conducted at room temperature. This reaction may advantageously be conducted in an atmosphere of an air or nitrogen or a nitrogen-air mixture.

At the end of the reaction of step a), a precipitate is obtained. It is optionally possible to have the precipitate undergo ripening by maintaining it for a certain time, for a few hours for example, in the aqueous phase.

According to a first advantageous alternative of the method according to the invention, the precipitate is not separated from the aqueous phase at the end of step a) and is left suspended in the aqueous phase of the reaction of step a).

According to another alternative of the method according to the invention, the method includes after step a) and before step b), a step α) for separating the precipitate formed at the end of step a) from the aqueous phase.

This separation step α) is carried out by any known means.

The separated precipitate may then be washed with water for example. Preferably the precipitate is not subject to any drying or freeze drying step or to any operation of this type.

The precipitate may optionally be resuspended in a second aqueous phase.

In order to obtain a dispersion in an organic phase, during step b), the precipitate obtained at the end of step a), whether it is separated from the aqueous phase or not, is put into contact with the organic phase in which the dispersion is desirably obtained.

This organic phase is of the type which has been described above.

The contacting of step b) is accomplished in the presence of the aforementioned amphiphlic agent, optionally after neutralization of the suspension obtained at the end of step a).

Preferably, the molar ratio between the number of moles of amphiphlic agent and the number of moles of iron is from 0.2 to 1, preferentially from 0.2 to 0.8.

The amount of organic phase to be incorporated is adjusted so as to obtain an oxide concentration as mentioned above.

The order of the introduction during step b) of the different elements of the dispersion is indifferent.

It is possible to put into contact the obtained precipitate, the amphiphilic agent and the organic phase, and optionally the promoter, simultaneously.

It is also possible to produce the premix of the amphiphilic agent and of the organic phase and optionally of the promoter.

The contacting between the precipitate and the organic phase may be accomplished in a reactor which is under an air, nitrogen or air-nitrogen mixture atmosphere.

Although the contact between the precipitate and the organic phase may be accomplished at room temperature, about 20° C., it is preferable to operate at a temperature selected in a range from 30° C. to 150° C., advantageously between 40° C. and 100° C.

In certain cases, due to the volatility of the organic phase, its vapors should be condensed by cooling it down to a temperature below its boiling point.

The reaction mixture resulting from the precipitate, from the organic phase and from the amphiphlic agent and optionally the promoter is maintained with stirring during the whole duration of the heating.

In the case of the first alternative where the precipitate has not been separated from the aqueous phase at the end of step a), when the heating is stopped, the presence of two new phases is noted: an organic phase containing the dispersion of particles, and a residual aqueous phase. The organic phase is then separated, containing the dispersion of particles and the residual aqueous phase according to conventional separation techniques, such as for example decantation or centrifugation.

Regardless of the alternative of the method, according to the present invention, organic dispersions are obtained at the end of step b), which have the aforementioned features.

The dispersion of the composition may comprise a mixture of particles consisting of an iron compound in the amorphous form and of particles consisting of an iron compound in the crystallized form.

In the case of mixtures, the ratio between the mass of particles of an iron compound in the crystallized form with a size greater than or equal to 4 nm and the mass of particles of an iron compound in the amorphous form with a size greater than or equal to 4 nm may be comprised between 1:10 and 10:1.

The dispersions comprising particles of an iron compound in amorphous form and particles of an iron compound in crystallized form may be obtained by mixing a first dispersion of particles of an iron compound in amorphous form in an organic phase with a second dispersion of particles of an iron compound in crystallized form.

The dispersion of the composition of the invention has the advantage of being very stable. The particles of the dispersion of the invention do not settle and the dispersions do not decant, even after several months. Further, it may have good compatibility with fuels of the gasoil type, notably based on biofuels.

According to a preferred alternative, it may further have high catalytic activity.

Detergent Based on a Polyester Quaternary Ammonium Salt

Detergents based on polyester quaternary ammonium salts of the invention include quaternized polyester amine, amide or ester salts.

The detergents may also be described as polyester quaternary salts.

The detergents of the invention may be described as the reaction product of:

(a) a polyester containing a tertiary amine group; and
(b) a quaternizing agent suitable for converting the tertiary amine group into a quaternary nitrogen.

The quaternizing agent may be selected from the group formed by dialkyl sulfates, benzyl halides, carbonates with hydrocarbyl substitution; hydrocarbyl epoxides combined with an acid or mixtures thereof.

Non-Quaternized Polyester

The polyester containing a tertiary amine group used in the preparation of the detergents of the invention may also be described as a non-quaternized polyester containing a tertiary amine group.

In certain embodiments, the polyester is the reaction product of a carboxylic fatty acid containing at least one hydroxyl group and a compound having an oxygen or nitrogen atom capable of condensing with said acid and further having a tertiary amine group.

Suitable carboxylic fatty acids which may be used in the preparation of the polyesters described above may be represented by the formula:

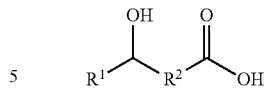
(I)

wherein $R^1$ is a hydrogen or a hydrocarbyl group containing from 1 to 20 carbon atoms and $R^2$ is a hydrocarbylene group containing from 1 to 20 carbon atoms. In certain embodiments, $R^1$ contains from 1 to 12, 2 to 10, 4 to 8 or even 6 carbon atoms and $R^2$ contains from 2 to 16, 6 to 14, 8 to 12, or even 10 carbon atoms.

In certain embodiments, the carboxylic fatty acid used in the preparation of the polyester is 12-hydroxystearic acid, ricinoleic acid, 12-hydroxydodecanoic acid, 5-hydroxydodecanoic acid, 5-hydroxydecanoic acid, 4-hydroxydecanoic acid, 10-hydroxyundecanoic acid or combinations thereof.

In certain embodiments, notably when the carboxylic fatty acid is of formula (I), the compound having an oxygen or nitrogen atom capable of condensing with said acid and further having a tertiary amine group is represented by the formula:

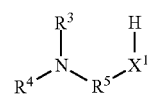
(II)

wherein $R^3$ is a hydrocarbyl group containing from 1 to 10 carbon atoms; $R^4$ is a hydrocarbyl group contain from 1 to 10 carbon atoms; $R^5$ is a hydrocarbylene group containing from 1 to 20 carbon atoms and $X^1$ is O or $NR^6$ wherein $R^6$ hydrogen or a hydrocarbyl group containing from 1 to 10 carbon atoms.

In certain embodiments, $R^3$ contains from 1 to 6, 1 to 2, or even 1 carbon atom, $R^4$ contains from 1 to 6, 1 to 2, or even 1 carbon atom, $R^5$ contains from 2 to 12, 2 to 8 or even 3 carbon atoms, and $R^6$ contains from 1 to 8, or 1 to 4 carbon atoms.

In some of these embodiments, the formula (II) becomes:

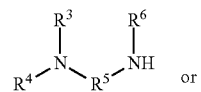
(II-a)

or

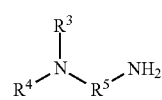
(II-b)

wherein the various definitions provided above are always applied.

Examples of compounds containing nitrogen or oxygen and capable of condensing with acylating agents, which also have a tertiary amine group, or of compounds which may be alkylated into such compounds, include, without being limited thereto: 1-aminopiperidine, 1-(2-aminoethyl)piperidine, 1-(3-aminopropyl)-2-pipecoline, 1-methyl-(4-methylamino)piperidine, 4-(1-pyrrolidinyl)piperidine, 1-(2-aminoethyl)pyrrolidine, 2-(2-amino-ethyl)-1-methylpyrrolidine, N,N-diethylethylenediamine, N,N-dimethylethylenediamine, N,N-dibutylethylenediamine, N,N-diethyl-1,3-diaminopropane, N,N-dimethyl-1,3-diaminopropane, N,N,N'- trimethylethylenediamine, N,N-dimethyl-N'-ethylethylenediamine, N,N-diethyl-N'-methylethylenediamine, N,N,N'-triethylethylenediamine, 3-dimethylaminopropylamine, 3-diethylaminopropylamine, 3-dibutylaminopropylamine, N,N,N'-trimethyl-1,3-propanediamine, N,N,2,2-tetramethyl-1,3-propanediamine, 2-amino-5-diethyl-aminopentane, N,N,N',N'-tetraethyldiethylenetriamine, 3,3'-diamino-N-methyl-dipropylamine, 3,3'-iminobis(N,N-dimethylpropylamine), or combinations thereof. In such embodiments, the resulting detergent includes a quaternary ammonium amide salt, i.e. a detergent containing an amide group and a quaternary ammonium salt.

The compounds containing nitrogen or oxygen may further include heterocyclic compounds with aminoalkyl substitution, such as 1-(3-aminopropyl)imidazole and 4-(3-aminopropyl)morpholine.

Another type of compounds containing nitrogen or oxygen capable of condensing with the acylating agent and having a tertiary amine group, in certain embodiments, after additional alkylation includes alkanolamines including, without being limited thereto, triethanolamine, N,N-dimethylaminopropanol, N,N-diethylaminopropanol, N,N-diethylaminobutanol, triisopropanolamine, 1-[2-hydroxyethyl]piperidine, 2-[2-(dimethyl-amine)ethoxy]-ethanol, N-ethyldiethanolamine, N-methyldiethanolamine, N-butyldiethanolamine, N,N-diethylaminoethanol, N,N-dimethylaminoethanol, and 2-dimethylamino-2-methyl-1-propanol. In embodiments wherein alkanolamines and/or similar materials are used, the resulting detergent includes quaternary ammonium ester salt, i.e. a detergent containing an ester group and a quaternary ammonium salt.

In an embodiment, the compound containing an oxygen or nitrogen atom is triisopropanolamine, 1-[2-hydroxyethyl]piperidine, 2-[2-(dimethylamino)ethoxy]ethanol, N-ethyldiethanolamine, N-methyldiethanolamine, N-butyldiethanolamine, N,N-diethylaminoethanol, N,N-dimethylaminoethanol, 2-dimethylamino-2-methyl-1-propanol, or combinations thereof.

In certain embodiments, the compound having an oxygen or nitrogen atom capable of condensing with said acid and further having a tertiary amine group comprises N,N-diethylethylenediamine, N,N-dimethylethylenediamine, N,N-dibutylethylenediamine, N,N-dimethyl-1,3-diaminopropane, N,N-diethyl-1,3-diaminopropane, N,N-dimethylaminoethanol, N,N-diethylaminoethanol, or combinations thereof.

The quaternized polyester salt may be a quaternized polyester amide salt. In such embodiments, the polyester containing a tertiary amine group used for preparing the quaternized polyester salt is a polyester amide containing a tertiary amine group.

In certain of these embodiments, the amine or the aminoalcohol reacts with a monomer, and the resulting material is then polymerized with an additional monomer, leading to the desired polyester amide which may then be quaternized.

In certain embodiments, the quaternized polyester salt includes a cation represented by the following formula:

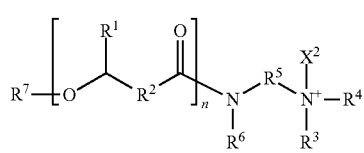

(III)

wherein $R^1$ is a hydrogen or a hydrocarbyl group containing from 1 to 20 carbon atoms and $R^2$ is a hydrocarbylene group containing from 1 to 20 carbon atoms, $R^3$ is a hydrocarbyl group containing from 1 to 10 carbon atoms, $R^4$ is a hydrocarbyl group containing from 1 to 10 carbon atoms; $R^5$ is a hydrocarbylene group containing from 1 to 20 carbon atoms; $R^6$ is a hydrogen or a hydrocarbyl group containing from 1 to 10 carbon atoms; n is number ranging from 1 to 10; $R^7$ is hydrogen, a hydrocarbonyl group containing from 1 to 22 carbon atoms or a hydrocarbyl group containing from 1 to 22 carbon atoms, and $X^2$ is a group derived from the quaternizing agent. In certain embodiments, $R^6$ is a hydrogen.

As above, in certain embodiment, $R^1$ contains from 1 to 12, 2 to 10, 4 to 8 or even 6 carbon atoms and $R^2$ contains from 2 to 16, 6 to 14, 8 to 12 or even 10 carbon atoms, $R^3$ contains from 1 to 6, 1 to 2, or even 1 carbon atoms, $R^4$ contains from 1 to 6, 1 to 2, or even 1 carbon atoms, $R^5$ contains from 2 to 12, 2 to 8 or even 3 carbon atoms, and $R^6$ contains from 1 to 8, or 1 to 4 carbon atoms. In any of these embodiments n may range from 2 to 9, or from 3 to 7, and $R^7$ and $R^7$ may contain from 6 to 22, or from 8 to 20 carbon atoms.

In these embodiments, the quaternized polyester salt is essentially capped by a $C_1$-$C_{22}$, or $C_8$-$C_{20}$ fatty acid. Examples of suitable acids include oleic acid, palmitic acid, stearic acid, erucic acid, lauric acid, 2-ethylhexanoïc acid, 9,11-linoleic acid, 9,12-linoleic acid, 9,12,15-linolenic acid, abietic acid, or combinations thereof.

The number average molecular weight (Mn) of the quaternized polyester salts of the invention may range from 500 to 3,000, or from 700 to 2,500.

The polyester useful in the present invention may be obtained by heating one or several hydroxycarboxylic acids or a mixture of a hydroxycarboxylic acid and of a carboxylic acid, optionally in the presence of an esterification catalyst. The hydroxycarboxylic acids may fit the formula HO—X—COOH in which X is a saturated or unsaturated divalent aliphatic radical containing at least 8 carbon atoms and wherein there are at least 4 carbon atoms between the hydroxy groups and the carboxylic acid groups, or from a mixture of such a hydroxycarboxylic acid and of a carboxylic acid which is without any hydroxy groups. This reaction may be carried out at a temperature in the range from 160° C. to 200° C., until the desired molecular weight is obtained. The course of the esterification may be tracked by measuring the acid number of the product, the desired polyester, in certain embodiments, having an acid number in the range from 10 to 100 mg of KOH/g or in the range from 20 to 50 KOH/g. The indicated acid number value ranging from 10 to 100 mg of KOH/g is equivalent to a number average molecular weight ranging from 560 to 5600. The water formed in the esterification reaction may be removed from the reaction mixture, and this may be carried out in a convenient way by having a nitrogen stream pass above the reaction mixture or by carrying out the reaction in the presence of solvent, such as toluene or xylene, and by removing the water by distillation gradually as it is formed.

The resulting polyester may then be isolated in a conventional way; however, when the reaction is carried out in the presence of an organic solvent, the presence of which will not be detrimental to the subsequent application, the resulting polyester solution may be used.

In said hydroxycarboxylic acids, the radical represented by X may contain from 12 to 20 carbon atoms, optionally 8 and 14 carbon atoms between the carboxylic acid and the hydroxyl group. In certain embodiments, the hydroxyl group is a secondary hydroxyl group.

Specific examples of such hydroxycarboxylic acids include ricinoleic acid, a mixture of 9- and 10-hydroxystearic acids (obtained by sulfatation of the oleic acid followed by hydrolysis), and 12-hydroxystearic acid, and notably the commercially available hydrogenated castor oil fatty acid which contains, in addition to 12-hydroxystearic acid, minor amounts of stearic acid and palmitic acid.

The carboxylic acids which may be used together with the hydroxycarboxylic acids in order to obtain these polyesters are preferably carboxylic acids of saturated or unsaturated aliphatic compounds, in particular alkyl- and alkenyl-carboxylic acids containing a chain of 8 to 20 carbon atoms. As examples of such acids, mention may be made of lauric acid, palmitic acid, stearic acid and oleic acid.

In an embodiment, the polyester is derived from commercial 12-hydroxy-stearic acid having a number average molecular weight of about 1,600. Polyesters such as the latter are described in more detail in the descriptions of British Patents Nos. 1,373,660 and 1,342,746.

In certain embodiments, the compounds used for preparing the detergents described above are substantially without, essentially without, or even entirely without any acylating agents with hydrocarbyl substitution and not containing any polyester, wherein said agents are the reaction product of a long chain hydrocarbon, generally a polyolefin reacted with a mono-unsaturated carboxylic acid reagent, such as (i) an α,β-mono-unsaturated $C_4$-$C_{10}$ dicarboxylic acid such as furmaric acid, itaconic acid, maleic acid; (ii) derivatives of (i) such as mono- or di-esters derived from $C_1$-$C_5$ alcohols or anhydrides of (i); (iii) an α,β-mono-unsaturated $C_3$-$C_{10}$ monocarboxylic acid such as acrylic acid and methacrylic acid; or (iv) derivatives of (iii), such as the esters of (iii) derived from $C_1$-$C_5$ alcohols with any compound containing an olefinic bond represented by the general formula ($R^9$)($R^{10}$)C=C($R^{11}$)(CH($R^7$)($R^8$)) wherein each of $R^9$ and $R^{10}$ is independently a hydrogen or a hydrocarbon group; each of $R^{11}$, $R^7$ and $R^8$ is independently a hydrogen or a hydrocarbon group and preferably at least one of them is a hydrocarbyl group containing at least 20 carbon atoms. In an embodiment, the acylating agent with hydrocarbyl substitution is a dicarboxylic acylating agent. In some of these embodiments, the acylating agent substituted with a hydrocarbyl comprises polyisobutylene succinic anhydride. In further other embodiments, the hydrocarbyl groups present in the detergents of the invention are without any polyisobutylene groups.

By the term of <<substantially without>>, it is meant that the components of the present invention mainly consist of materials other than the acylating agents with hydrocarbyl substitution as described above, so that these agents are not significantly involved in the reaction and that the compositions of the invention do not contain significant amounts of detergents derived from such agents.

In certain embodiments, the components of the invention, or the compositions of the invention, may contain less than 10% by weight of these agents, or of detergents derived from these agents. In other embodiments, the maximum allowed amount may be of 5, 3, 2, 1 or even 0.5 or 0.1% by weight. One of the purposes of these embodiments is to allow the exclusion of agents such as polyisobutylene succinic anhydrides from the reactions of the invention and to therefore also allow exclusion of a detergent based on a quaternized salt derived from agents such as polyisobutylene succinic anhydrides. The detergents based on a polyester quaternary salt or hyperdispersants, form the central point of the present invention.

The Quaternizing Agent

The detergents based on a quaternized salt of the present invention are formed when the non-quaternized detergents described above are reacted with a quaternizing agent. Suitable quaternizing agents include dialkyl sulfates, benzyl halides, carbonates with hydrocarbyl substitution, hydrocarbyl epoxides in combination with an acid, or mixtures thereof.

In an embodiment, the quaternizing agent may include alkyl halides such as chlorides, iodides or bromides; alkyl sulfonates; dialkyl sulfates such as dimethyl sulfate; sultones; alkyl phosphates, such as $C_1$-$C_{12}$ trialkylphosphates; $C_1$-$C_{12}$ di-alkylphosphates; borates; $C_1$-$C_{12}$ alkylborates; alkyl nitrites; alkyl nitrates; dialkyl carbonates, alkyl alkanoates, O,O-di-($C_1$-$C_{12}$)alkyl dithiophosphates, or mixtures thereof.

In an embodiment, the quaternizing agent may be derived from dialkyl sulfates such as dimethyl sulphate, N-oxides, sultones such as propane- and butane-sultone; alkyl, acyl or aralkyl halides such as methyl and ethyl chloride, bromide or iodide or benzyl chloride, and carbonates with hydrocarbyl (or alkyl) substitution. If the alkyl halide is benzyl chloride, the aromatic ring is optionally further substituted with alkyl or alkenyl groups.

The hydrocarbyl (or alkyl) groups of the carbonates with hydrocarbyl substitution may comprise from 1 to 50, 1 to 20, or 1 to 5 carbon atoms per group. In an embodiment, the carbonates with hydrocarbyl substitution contain two hydrocarbyl groups which may be either identical or different. Examples of suitable carbonates with hydrocarbyl substitution include dimethyl or diethyl carbonates.

In another embodiment, the quaternizing agent may be a hydrocarbyl epoxide, as represented by the following formula, in combination with an acid:

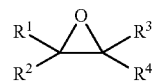

(VIII)

wherein $R^1$, $R^2$, $R^3$ and $R^4$ may be independently H or a hydrocarbyl group containing from 1 to 50 carbon atoms. Examples of hydrocarbyl epoxides include: ethylene oxide, propylene oxide, butylene oxide, styrene oxide and combinations thereof. In an embodiment, the quaternizing agent does not contain any styrene oxide.

In certain embodiments, the acid used with the hydrocarbyl epoxide may be a separate component such as acetic acid. In other embodiments, for example when the acylating agent based on a hydrocarbyl is a dicarboxylic acylating agent; no separate acid component is required. In such embodiments, the detergent may be prepared by the combination of reagents which are essentially without, or even without a separate acid component, such as acetic acid, and depend, in place of the acid group, on the acylating agent based on hydrocarbyl. In other embodiments, a small amount of an acid component may be present, but with <0.2 or even <0.1 mole of acid per mole of acylating agent based on hydrocarbyl.

In certain embodiments, the quaternizing agent of the invention does not contain any substituting group which contains more than 20 carbon atoms. In other words, certain embodiments, the long chain substituent group allowing the resulting detergent to be soluble in organic solvents and therefore useful for the purposes of the present invention is not provided by the quaternizing agent but is rather brought to the detergent by the non-quaternized detergents described above.

In certain of the embodiments, the molar ratio of detergents having an amine functionality over the quaternizing agents ranging from 1:0.1 to 2, or from 1:1 to 1.5, or from 1:1 to 1.3.

Example Q-1

A non-quaternized polyester amide preparatory material is prepared by the reaction, in a jacketed reactor equipped with a stirrer, a condenser, a supply pump attached to a sub-addition pipe (addition under the surface of the reaction mixture), with a supply of nitrogen and a thermocouple/system for controlling the temperature of 6 moles of 12-hydroxystearic acid and of 1 mole of dimethylaminopropylamine, wherein the reaction is conducted at about 130° C. and held at this temperature for about 4 hours. The reaction mixture is then cooled down to about 100° C. and zirconium butylate is added according to an amount such that the material is 0.57% by weight of the reaction mixture. The reaction mixture is heated up to about 195° C. and held at this temperature for about 12 hours. The resulting preparatory material is cooled and recovered.

A detergent based on quaternized polyester amide salt is prepared by the reaction, in a jacketed reactor equipped with a stirrer, with a condenser, with a supply pump attached to a sub-addition pipe (addition under the surface of the reaction mixture), with a nitrogen supply and a thermocouple/system for controlling the temperature of 600 g of the non-quaternized polyester amide preparatory material described above, of 120 grams of 2-ethylhexanol, of 18.5 grams of acetic acid, and of 32.3 mL of propylene oxide, wherein the reaction is conducted at about 90° C. and the propylene oxide is supplied to the reactor within about 3.5 hours. The reaction mixture is then maintained at this temperature for about 3 hours. 760 grams of product are cooled and recovered, for which the TAN (Total Acid Number), FTIR (Fourier Transform Infra-Red) and ESI-SM (Electro Spray Mass Spectrometry) analyses confirm that it consists of about 80% by weight of detergent based on a quaternized polyester amide salt, the remaining material being mainly non-quaternized polyester amide. The recovered material has a TAN of 1.26 mg of KOH/gram, a TBN (Total Base Number) of 23.82 mg of KOH/gram, a kinematic viscosity of 100° C. of 28.58 cSt (as measured by ASTM D445), an IR acetate peak at 1,574 cm$^{-1}$, and contains 1.22% of nitrogen.

Example Q-2

A non-quaternized polyester amide preparatory material is prepared by the reaction, in a jacketed reactor equipped with a stirrer, a condenser, a supply pump attached to a sub-addition pipe (addition under the surface of the reaction mixture), with a nitrogen supply and a thermocouple/system for controlling the temperature of 1,300 grams of ricinoleic acid and of 73.5 grams of dimethylaminopropylamine wherein the reaction is conducted at about 130° C., the amine is added dropwise within about 8 minutes, and the reaction mixture is maintained at this temperature for about 4 hours. The reaction mixture is then cooled down to about 100° C. and 7.8 grams of zirconium butylate are added. The reaction mixture is heated up to about 195° C. and maintained at this temperature for about 17 hours. The resulting product is filtered, cooled and recovered. 1,301 grams of product are recovered, having a TAN of 0 mg of KOH/gram and exhibiting with FTIR an ester peak at 1,732 cm$^{-1}$, an amide peak at 1,654 cm$^{-1}$, but no acid peak at 1,700 cm$^{-1}$.

A detergent based on quaternized polyester amide salt is prepared by the reaction, in a jacketed reactor equipped with a stirrer, a condenser, a supply pump attached to a sub-addition pipe (addition under the surface of the reaction mixture), with a nitrogen conduit and thermocouple/system for controlling the temperature, of 600 grams of non-quaternized polyester amide preparatory material described above, of 123 grams of 2-ethylhexanol, of 18.9 grams of acetic acid and of 33.1 mL of propylene oxide, wherein the reaction is conducted at about 90° C. and the propylene oxide is fed into the reactor within about 3.5 hours. The reaction mixture is then maintained at this temperature for about 3 hours. 751 grams of product are cooled and recovered, for which the TAN, FTIR and ESI-SM analyses confirm that it consists of about 70% by weight of a detergent based on quaternized polyester amide salt, the remaining material being mainly non-quaternized polyester amide. The recovered material has a TAN of 0 mg of KOH/gram, a TBN of 23.14 mg of KOH/gram, a kinematic viscosity at 100° C. of 47.0 cSt (as measured by ASTM D445), an IR acetate peak at IR 1,574 cm$^{-1}$.

Oxygenated Detergent

In certain embodiments, the compositions of the present invention further comprise an oxygenated detergent.

The oxygenated detergent may comprise a hydrocarbon compound bearing at least two substituents which are carboxy functions in the form of acids or at least one carboxy function as an anhydride.

In certain embodiments, the oxygenated detergent additive is a hydrocarbon compound bearing at least two substituents which are carboxy functions as acids or anhydrides.

In other embodiments, the oxygenated detergent additive is a succinic acylation agent with hydrocarbon substitution.

In other embodiments, the oxygenated detergent additive with hydrocarbon substitution is a dimeric acid compound.

In other further embodiments, the oxygenated detergent additive with hydrocarbon substitution of the present invention comprises a combination of two or more than two of the oxygenated detergent additives described in this column.

As suitable oxygenated detergent additives with hydrocarbon substitution, mention may be made of dimeric acids. Dimeric acids are a type of diacid polymer derived from fatty acids and/or polyolefins, notably the polyalkenes described here, which contain an acid function.

In certain embodiments, the dimeric acid used in the present invention is derived from $C_{10}$-$C_{20}$, $C_{12}$-$C_{18}$ and/or $C_{16}$-$C_{18}$ polyolefins.

Among the oxygenated detergents with hydrocarbon substitution, mention may be made of acids, halides, succinic anhydrides and combinations thereof.

In certain embodiments, the agents are acids or anhydrides and in other embodiments, the agents are anhydrides, and in other further embodiments the agents are hydrolyzed anhydrides. The hydrocarbon compound of the substituted hydrocarbon additive and/or the primary hydrocarbon group of the succinic acylation agent with hydrocarbon substitution generally contains an average of at least 8, or 30, or 35 up to 350, or up to 200, or up to 100 carbon atoms.

In an embodiment, the hydrocarbon group is derived from a polyalkene. As suitable polyalkenes, mention may be made of homopolymers and interpolymers of monomers of polymerizable olefins with 2 to 16, or 6, or 4 carbon atoms. As suitable olefins and polyolefins, mention may be made of all those described in the previous columns.

In certain embodiments, the olefin is a monoolefin such as ethylene, propylene, 1-butene, isobutene and 1-octene, or a polyolefinic monomer, such as a diolefinic monomer such as 1,3-butadiene and isoprene.

In an embodiment, the interpolymer is a homopolymer. An example of a polymer is a polybutene. In a particular case, 50% of the polybutene stems from isobutylene. The polyalkenes are prepared by standard operating procedures.

In an embodiment, the hydrocarbon groups are derived from polyalkylenes for which the value of Mn is of at least 1,300, or 1,500, or 1,600 up to 5,000, or up to 3,000, or up to 2,500, or up to 2,000, or up to 1,800, and the Mw/Mn ratio is of 1.5 or 1.8, or 2, or up to 2.5 to 3.6, or up to 3.2.

In certain embodiments, the polyalkene is a polyisobutylene having a molecular mass from 800 to 1,200.

In another embodiment, the acylation agents with hydrocarbon substitution and/or substituted succinic acid acylation agents are prepared by reaction of the polyalkylene described above with an excess of maleic anhydride in order to obtain substituted succinic acylation agents in which the number of succinic groups for each equivalent by weight of substituent groups is of at least 1.3, or up to 1.5, or up to 1.7, or up to 1.8. The maximum number will generally not exceed 4.5, or up to 2.5, or up to 2.1, or up to 2.0. The polyalkylene may be here any of those described above.

In another embodiment, the hydrocarbon and/or the hydrocarbon group contain an average 8, or 10, or 12 up to 40, or up to 30, or up to 34 or up to 20 carbon atoms.

In an embodiment, the hydrocarbon group contains an average of 16 to 18 carbon atoms.

The olefin, the olefin oligomer or the polyalkene may be reacted with the carboxylic reagent so that there is at least one mole of carboxylic reagent per mole of olefin, of olefin oligomer or of polyalkene which reacts.

As examples of patents describing various operating procedures giving the possibility of preparing useful acylation agents, mention may be made of the patents U.S. Pat. Nos. 3,172,892; 3,215,707; 3,219,666; 3,231,587; 3,912,764; 4,110,349 and 4,234,435.

In certain embodiments, the oxygenated detergents with hydrocarbon substitution and/or the succinic acylation agents with hydrocarbon substitution contain a diacid function.

In certain embodiments, the hydrocarbon group of the succinic acylation agent with hydrocarbon substitution is derived from polyisobutylene and the diacid function of the agent is derived from carboxylic acid groups, such as a succinic acid with hydrocarbon substitution.

In certain embodiments, the acylation agent with hydrocarbon substitution comprises one or several succinic anhydride groups with hydrocarbon substitution.

In certain embodiments, the acylation agent with hydrocarbon substitution comprises one or several hydrolyzed succinic anhydride groups with hydrocarbon substitution.

In certain embodiments, the oxygenated detergent is a polyisobutylene compound including a succinic anhydride or succinic acid head group.

The oxygenated detergent may be a succinic polyisobutylene anhydride and/or a hydrolyzed version of the latter. The preparation of suitable oxygenating detergents is described in the international patent application WO 2006/063161 A2.

As a non-limiting example, the preparations of two oxygenated detergents are shown below.

Example O-1

Glissopal™ 1000 (18.18 kg) is loaded in a sealed tank at 100° C. and stirred. The tank is heated to 167° C. and vacuum is applied. The tank is then pressurized with a nitrogen atmosphere (1 bar) while it is heated to 175° C. Once the product has attained 175° C., maleic anhydride (2.32 kg) is added by means of a heated jacketed syringe pump (ISCO pump) within about 9 hours. The reaction temperature is slowly raised, during the whole period for feeding the maleic anhydride, from 175° C. in order to attain 225° C. at the end of the loading. The reaction is then maintained at 225° C. for a further 10 hours. The resulting succinic polyisobutylene anhydride (PIBSA) has a kinematic viscosity of 100° C. of 570 cSt (mm/s) and a total acid number (TAN) of 127 mg KOH/g.

Example O-2

The PIBSA of example O-1 (340 g) is loaded into a reactor and mixed with Pilot™ 900 (60 g). The contents of the tank are stirred at 400 revolutions/min for 1 hour, and then heated to 90° C. The tank is then loaded with nitrogen in order to provide an inert atmosphere. Water (5.9 g) is added to the mixture within 10 minutes. The mixture is then stirred for 2 hours. The resulting hydrolyzed PIBSA has a total acid number of 163 mg/KOH and a kinematic viscosity at 100° C. of 500 mm/s (cSt). The product formed contains 85% by weight of the hydrolyzed product and 15% by weight of Pilot® 900. The carbonyl/water ratio is 0.5/1.

When the detergent compositions of the present invention both contain a detergent of the quaternary ammonium salt type and an oxygenated detergent, the weight ratio of the detergent of the quaternary ammonium salt type to the oxygenated detergent may be from 1/10 to 10.1, 1/8 to 8/1, 1/1 to 8/1 or 3/1 to 7/1, all the weight ratios being calculated on a basis without any solvent. In other embodiments, the weight ratio may be from 2/1 to 4/1.

As is understood here, the term of "hydrocarbon substituent" or "hydrocarbon group" is used in its ordinary sense, which is well known to one skilled in the art. In order to be more specific, it designates a group including a carbon atom directly attached onto the remainder of the molecule and having a mainly hydrocarbon nature. As examples of hydrocarbon groups, mention may be made of: hydrocarbon substituents, i.e. aliphatic substituents (for example alkyl or alkenyl), alicyclic substituents (for example cycloalkyl, cycloalkenyl) and aromatic substituents with aromatic, aliphatic and alicyclic substitution, as well as cyclic substituents in which the ring is completed by another portion of the molecule (for example two substituents forming together a ring); substituted hydrocarbon substituents, i.e. substituents containing non-hydrocarbon groups which, in the context of this invention, do not modify the mainly hydrocarbon nature of the substituent (for example halogeno (more particularly chloro and fluoro), hydroxy, alkoxy, mercapto, alkylmercapto, nitro, nitroso and sulfoxy); hetero-substituents, i.e. substituents which, while having a mainly hydrocarbon nature, in the context of this invention, contain something other than carbon in a ring or a chain moreover consisting of carbon atoms. As hetero-atoms, mention may be made of sulfur, oxygen, nitrogen, and this covers substituents like pyridyl, furyl, thienyl and imidazolyl. Generally, not more than two, preferably not more than one non-hydrocarbon substituent will be present per group of 10 carbon atoms in the hydrocarbon group, and typically there will not be any non-hydrocarbon substituents in the hydrocarbon group.

The present invention also relates to a method for preparing the composition according to the invention, said method comprising a step for putting into contact and for mixing a detergent and a dispersion according to the invention, whereby the composition is obtained.

The composition of the invention, i.e. the composition containing the additive for assisting regeneration of the PF in the form of a dispersion of particles of an iron compound in crystallized form and the detergent, may be obtained by mixing the detergent composition and the dispersion by any conventional means allowing the mixing, this mixing being generally obtained by stirring at a temperature close to room temperature (from 15 to 30° C.).

The weight ratio between the dispersion and the detergent composition may greatly vary according to different parameters such as the characteristics of the engine and of its equipment notably the fuel injectors, its polluting emissions, notably the amount of emitted soots, the architecture of the exhaust and depollution line, notably the use of a PF or a Catalyzed Filter containing a catalyst and its proximity to the manifold of the engine, the means allowing an increase in the temperature in order to trigger the regeneration or further the geographical area in which the vehicle will circulate, the latter defining the quality of the fuel which the vehicle will use.

This weight ratio between the dispersion and the detergent composition may typically vary between 10/90 and 90/10, in certain cases between 20/80 and 80/20 and in certain further more specific cases between 40/60 and 60/40.

In the composition of the present invention, the iron content may be comprised between 0.05% and 25%, more particularly between 2% and 15%, this concentration being expressed in weight % of iron metal based on the total weight of the composition.

The compositions according to the present invention have the advantage of developing moderate kinematic viscosity, notably at low temperatures (below 0° C.).

The organic dispersions according to the invention have the particularity, once they are additived with the fuel, of not consequently reducing the stability of said fuel, in particular when the latter contains not very stable fractions such as fractions of biofuels like methyl esters of vegetable oils. The stability of the fuel may be measured through its resistance to oxidation.

For this several types of test are known to the profession. Mention may be made of the test based on the NF EN 15751 standard (Fuels for automobiles—Fatty acid methyl esters (FAME) and mixtures with gas oil—Determination of the stability to oxidation by an accelerated oxidation method) consisting of oxidizing the heated fuel by air bubbling. The vapors produced during the oxidation process are condensed in water. An increase in the electric conductivity of this water expresses solubilization of volatile acid compounds formed during the process of oxidation of the fuel and thereby its oxidation. This is then referred to as an induction time, a time representing the duration of heating required for the occurrence of a rapid increase in the electric conductivity. The greater this induction time, the more the fuel resists oxidation. This test is also called a RANCIMAT test.

Another type of test consists of quantifying by chemical dosage (such as according to the ISO 6619 standard), increase in the acidity of the heated fuel following oxygen bubbling (Aging test EN ISO 12205 (petroleum products—Determination of the stability to oxidation of medium petroleum distillates (1966)). The time-dependent change of the acidity is expressed according to the acidity or $\Delta$ TAN difference between the aged and non-aged fuel. The greater the $\Delta$ TAN the more the fuel was oxidized.

The invention also relates to an additived fuel comprising a fuel and a composition according to the invention.

The invention also relates to a method for preparing an additived fuel according to the invention, comprising a step for putting into contact and mixing a fuel and a composition according to the invention, whereby the additived fuel is obtained.

The compositions according to the invention may be used as a fuel additive for internal combustion engines, more particularly as an additive of gasoils for diesel engines or other engines such as certain gasoline engines emitting soots or carbonaceous particles, and for example as additives of biofuels.

They may more generally be used as combustion additives in combustible materials or liquid fuels of energy generators such as internal combustion engines (positive ignition engines), electric generating sets, oil burners or jet propulsion engines.

The additived fuels according to the invention may be used in combination with a PF not containing any catalyst, or else with a PF containing a catalyst such as a CSF.

The nature of the catalyst making up the CSF may be of any type, notably based on precious metals such as platinum or palladium associated with different supporting or binding materials such as alumina. Materials which may be reduced like oxides based on rare earths, such as cerium oxide or oxides based on manganese may also be associated.

The compositions according to the invention or a Fuel Borne Catalyst (FBC), may be additived to fuels according to any means known to one skilled in the art, both by a vectorization device loaded on-board a vehicle but also directly additived in the fuel before the latter is introduced on the vehicle. The latter case may advantageously be used in the case of vehicle fleets equipped with PFs and having their own gas station for refilling with fuel.

The devices loaded on-board the vehicle may notably be devices comprising a tank, giving the possibility of loading on-board a volume of the composition according to the invention and giving the possibility of covering a certain range, as well as a means for vectorizing the composition towards the fuel like a metering pump injecting a defined amount of the composition into the fuel tank of the vehicle and a tool for driving this vectorization means.

The engine may be continuously fed with a fuel additived with FBC, the concentration may be stable or variable over time. The engine may also be alternatively fed with an additived and non-additived fuel. The amount of FBC to be added to the fuel may widely vary depending on different parameters such as the characteristics of the engine and of its equipment, its polluting emissions, notably the amount of emitted soots, the architecture of the exhaust and depolluting line, notably the use of a PF or of an CSF containing a catalyst and its proximity to the manifold of the engine, the means allowing an increase in the temperature for triggering regeneration or else in the geographical area in which the vehicle will circulate, the latter defining the quality of the fuel which the vehicle will use.

The FBC may also be injected into the exhaust line upstream from the PF, preferably with a means allowing final dispersion of the particles into the bed of soots. This case is particularly adapted to the case when the regeneration of the PF is accomplished by direct injection of the fuel into the exhaust line upstream from the PF, whether this fuel is burned on an oxidation catalyst upstream from the PF or else by a burner or by any other means.

Preferably, the fuel comprised in the additived fuel is selected from the group consisting of gas oils and biofuels.

The fuels suitable for preparing an additived fuel according to the present invention notably comprise commercially available fuels and in certain embodiments, all the commercially available gas oil fuels and/or biofuels.

The gas oil fuels may also be called diesel fuels.

The fuels based on bio-additives are also called biofuels.

The suitable fuels for applying the invention are not too limited, and are generally liquid at room temperature, for example from 20 to 30° C.

The liquid fuel may be a fuel of the hydrocarbon type, a fuel of a type other than a hydrocarbon, or one of their mixtures.

The fuel of the hydrocarbon type may be a petroleum distillate, notably a gasoline according to the definition given by the ASTM D4814 standard or a gas oil fuel according to the definition given by the ASTM D975 standard or the European standard EN590+A1.

In an embodiment, the liquid fuel is a gasoline, and in another embodiment, the liquid fuel is a lead-free gasoline.

In another embodiment, the liquid fuel is a gas oil fuel.

The fuel of the hydrocarbon type may be a hydrocarbon prepared by a method for transforming a gas into a liquid in order to include for example hydrocarbons prepared by a process such as the Fischer-Tropsch process.

In certain embodiments, the fuel applied in the present invention is a gas oil fuel, a gas oil biofuel or combinations thereof.

The fuel of a type other than a hydrocarbon may be a composition containing oxygen atoms, which is often called an oxygenation product, which comprises an alcohol, an ether, a ketone, an ester of a carboxylic acid, a nitroalkane, or one of their mixtures. The fuel of a type other than a hydrocarbon may for example comprise methanol, ethanol, methyl-t-butyl ether, methyl ethyl ketone, trans-esterified oils and/or fats of vegetable or animal origin such as rape seed methyl ester and soya methyl ester, and nitromethane.

The mixtures of fuels of the hydrocarbon type and of the type other than a hydrocarbon may comprise for example gasoline and methanol and/or ethanol, gas oil fuel and ethanol, and gas oil fuel and a trans-esterified vegetable oil such as rape seed methyl ester and other bio-derived fuels.

In an embodiment, the liquid fuel is a water emulsion in a fuel of the hydrocarbon type, a fuel of a type other than a hydrocarbon, or one of their mixtures.

In several embodiments of this invention, the liquid fuel may have a sulfur content, on a basis by weight, which is of 5,000 ppm or less, a 1,000 ppm or less, or 300 ppm or less, 200 ppm or less, 30 ppm or less or 10 ppm or less.

The liquid fuel of the invention is present in an additived fuel according to the invention in a major amount, i.e. generally greater than 95% by weight, and in other embodiments, it is present in an amount of more than 97% by weight, of more than 99.5% by weight or more than 99.9% by weight.

The fuels suitable for applying the present invention optionally comprise one or several additional performance additives, solvents or diluents. These performance additives may be of any type and for example allow improvement in the distribution of the fuel in the engine and/or the improvement of the performances of the operation of the engine and/or improvement in the stability of the operation of the engine.

As an example and without being limited, it is possible to mention antioxidants like sterically hindered phenol, detergent and/or dispersant additives such as nitrogen-containing detergents or succinimides or further agents improving cold flow such as an esterified copolymer of maleic anhydride and styrene.

The compositions of the present invention may further comprise one or several additional performance additives, solvents or diluents.

The additional performance additives may comprise: an antioxidant such as a sterically hindered phenol or one of its derivatives and/or a diarylamine or one of its derivatives; a corrosion inhibitor; and/or a detergent/dispersant additive, other than the additive for fuel of the present invention, such as a polyetheramine or a nitrogen-containing detergent, notably, but without any limitation, PIB-amine detergents/dispersants and succinimide detergent/dispersants.

The additional performance additives may also cover: an agent improving cold flow such as an esterified copolymer of maleic anhydride and of styrene and/or a copolymer of ethylene and vinyl acetate; a foam inhibitor and/or an anti-foam agent such as a silicone oil; a de-emulsifier such as polyalkoxylated alcohol; a creaminess agent such as a carboxylic fatty acid; a metal deactivator such as an aromatic triazole or one of its derivatives, notably, but without any limitation, benzotriazole; and/or an additive against valve seat recession such as an alkaline metal sulfosuccinate salt.

The total combined amount of the present additional performance additive compounds, on a base without any solvent/oil, may range from 0 or 0.01% by weight to 65, 50, or even 25% by weight, or from 0.01% by weight to 20% by weight of the composition. Even if one or several of the other performance additives may be present, it is common that the other performance additives are present in different amounts relatively to each other.

The invention also relates to a method for applying an internal combustion engine comprising a step for delivering to said engine a fuel and a composition according to the invention.

In an embodiment, the composition of the invention is combined with the fuel by direct addition and the additived fuel is used for operating an engine equipped with an exhaust system with a PF.

The additived fuel containing the composition of the invention may be contained in a fuel tank, transmitted to the engine where it is combusted, and the iron oxide particles reduce the oxidation temperature of the soots collected in the PF.

In another embodiment, one resorts to the operating procedure above, except that the composition of the invention is maintained on-board the apparatus driven by the engine (for example an automobile, a bus, a truck, etc.,) in a tank with a composition separated from the fuel. In these embodiments, the composition is combined or mixed with the fuel during the operation of the engine. Like other techniques, it is also possible to add the composition of the invention to the fuel and/or to the fuel tank, or at the fuel deposits before filling the tank of the motor-driven vehicle.

The composition of the invention may be added to the fuel in an amount that such that the iron mass content in the additived fuel is comprised from 1 ppm to 50 ppm, more particularly from 2 ppm to 20 ppm, in iron metal based on the total mass of the fuel.

When the invention is used as a liquid fuel composition for an internal combustion engine, suitable internal combustion engines cover the spark ignition engines and compression ignition engines; 2 stroke or 4 stroke cycles; a liquid fuel obtained by direct injection, indirect injection, injection by a nozzle and a carburetor; the current systems with a rail injector and a pump-injector; engines for lightweight vehicles (for example a passenger vehicle) and heavy duty vehicles (for example a commercial truck); and engines which operate with fuels of the hydrocarbon type and of the type other than a hydrocarbon and mixtures thereof. The engines may be part of integrated emission systems containing elements such as EGR systems; a post-treatment including a three-way catalyst, an oxidation catalyst, NOx absorbers and catalysts, catalyzed and non-catalyzed particle traps; variable distribution; and synchronization of the injection and a configuration of the flow rate.

It is known that some of the products described above may interact in the final formulation, so that the constituents of the final formulation may be different from those which are added initially. The thereby formed products, notably the products formed by means of the composition of the present invention in its envisioned use, may not be easily described. Nevertheless, all these alternatives and all these reaction products enter the scope of the present invention; the present invention covers the compositions prepared by mixing the constituents described above.

EXAMPLES

Example 1

Preparation of the Dispersions of Iron Particles

Example 1A

Preparation of the Dispersions of Iron Particles in Crystallized Form

Preparation of the Iron Precursor Solution

One liter of solution is prepared in the following way: 576 g of $Fe(NO_3)_3$ are mixed with 99.4 g of $FeCl_2$, $4H_2O$. The mixture is completed with distilled water in order to obtain one liter of solution. The final concentration of this solution of iron precursors is 1.5 mol·$L^{-1}$ of Fe.

Preparation of the Soda Solution

A 6 mol·$L^{-1}$ NaOH solution is prepared in the following way: 240 g of soda tablets are diluted in distilled water in order to obtain one liter of solution.

In a one liter reactor equipped with a stirring system, a tank bottom consisting of 400 mL of a 3 mol·$L^{-1}$ sodium nitrate $NaNO_3$ solution is introduced. The pH of the solution is adjusted to 13 with a few drops of 6 mol/L soda. The formation of the precipitate is accomplished by simultaneous addition of the solution of iron precursors and of the soda solution prepared earlier. The introduction flow rates of both of these reagents are adjusted so that the pH is maintained constant and equal to 13 at room temperature.

823.8 g of the solution obtained by precipitation (i.e. 21.75 g of an $Fe_2O_3$ equivalent or further 0.27 moles of Fe), neutralized beforehand, are redispersed in a solution containing 24.1 g of isostearic acid (Prisorine 3501 cut provided by Croda) and 106.4 g of Isopar L. The suspension is introduced into a jacketed reactor equipped with a thermostated bath and provided with a stirrer. The reaction mixture is brought to 90° C. for 4 h.

After cooling, the mixture is transferred into a test tube. Demixing is observed and a 500 mL aqueous phase and a 100 mL organic phase are collected. This organic dispersion has an iron mass content of 10%, expressed on the basis of iron metal, based on the total mass of the collected dispersion.

The obtained product is stable for at least one month of storage at room temperature, no decantation being observed.

Example 1B

Preparation of a Dispersion of Iron Particles in Crystallized Form

The same procedure is followed as the one in Example 1A, except that before introducing the reagents into the tank bottom, the pH of the sodium nitrate solution is adjusted to 11 and during the formation of the precipitate, the flow rates for introducing the solution of iron precursors and the soda solution are adjusted so that the pH is maintained constant and equal to 11 at room temperature.

Example 1C

Preparation of a Dispersion of Iron Particles in the Amorphous Form

Preparation of a Solution of Iron Acetate 412.2 g of $Fe(NO_3)_3$, $5H_2O$ at 98% are introduced into a beaker and distilled water is added thereto up to a volume of 2 liters. The solution is a 0.5M Fe solution. 650 ml of 10% ammonia are added dropwise with stirring and at room temperature in order to attain a pH of 7.

The mixture is centrifuged for 10 minutes at 4500 rpm and the mother waters are then removed. The solid is resuspended in distilled water to a total volume of 2,650 mL. The mixture is stirred for 10 mins, and then centrifuged for 10 mins at 4,500 rpm. The mother waters are removed and the solid is resuspended in distilled water to a total volume of 2,650 mL. Stirring is left for 30 mins. 206 mL of concentrated acetic acid are then added. Stirring is left overnight. The obtained iron acetate solution is limpid.

The formation of the precipitate is then achieved in a continuous assembly comprising:

a reactor of one liter equipped with a stirrer with blades with an initial tank bottom consisting of 500 mL of distilled water, this reaction volume being kept constant by means of an overflow; and two supply flasks containing the iron acetate solution prepared beforehand on the one hand and a 10% ammonia solution on the other hand.

The iron acetate solution and the 10% ammonia solution are added together. The flow rates of both solutions are set so that the pH is maintained constant and equal to 8.

The obtained precipitate is separated from the mother waters by centrifugation at 4,500 rpm for 10 mins. 95.5 g of hydrate are collected with 21.5% of dry extract (i.e. 20.0 g of equivalent $Fe_2O_3$ or 0.25 mol of Fe) and are then redispersed in a solution containing 39.2 g of isostearic acid in 80.8 g of Isopar L. The suspension is introduced in a jacketed reactor equipped with a thermostatic bath and provided with a stirrer. The reaction is brought to 90° C. for 5 h 30 mins.

After cooling it is transferred into a test tube. Demixing is observed and a 50 mL aqueous phase and a 220 mL organic phase are collected. The collected organic dispersion has a 10% iron mass content, expressed as a mass of metal iron relatively to the total mass of the collected dispersion.

Example 2

Characterization of the Iron Particle Dispersions

Example 2.1

X-Ray Diffraction (XRD)

The XRD analysis was carried out according to the indications given in the description.

It is seen that the peaks of the diffractograms of the dispersion of Example 1A and of the dispersion of Example 1B actually correspond to the XRD diffraction peaks characteristic of the crystallized magnetite and/or maghemite phase (sheet ICDD 01-088-0315).

The diffractogram of the dispersion of Example 1C does not have any significant XRD peak, which allows the conclusion to be drawn that the iron phase is in an amorphous form.

The calculation of the crystallite size according to the method shown earlier leads to crystallite sizes of 4 nm for Example 1A which are compliant and 9 nm for Example 1B, respectively.

Example 2.2

Transmission Electron Microscopy (TEM)

Analysis by TEM was carried out according to the indications given in the description.

The characteristics from this TEM counting: percentage of particles less than 7 nm, $\phi 50$, polydispersity index $P_n$ are reported in Table 1.

TABLE 1

|  | % of particles <7 nm | $\Phi_{50}$ (nm) | $P_n$ |
|---|---|---|---|
| Example 1A | 95% | 3.8 nm | 0.35 |
| Example 1B | 72% | 5.7 nm | 0.35 |
| Example 1C | 98% | 3.5 nm | 0.22 |

Example 2.3

Dynamic Light Scattering (DLS)

DLS analysis was carried out according to the indications given in the description.

The average hydrodynamic diameters $D_h$ in intensity are reported in Table 2.

TABLE 2

|  | $D_h$ |
|---|---|
| Example 1A | 11.6 |
| Example 1B | 22 |
| Example 1C | 13.5 |

Example 3

Synthesis of Detergent Compositions Based on Quaternized Polyester Amide Salt

Example 3A

A detergent composition based on a quaternized polyester amide salt is prepared by reaction of a non-quaternized polyester amide salt with 2-ethylhexanol, acetic acid and propylene oxide at about 90° C. according to the indications of example Q-1 described in the description, except that more solvent is introduced during the preparation. The prepared detergent composition contains about 75% by weight of detergent based on quaternized polyester amide salt.

Example 3B

A detergent composition is prepared by mixing 35 parts by weight of the compound of Example 3A with 9 parts by weight of an oxygenated detergent, the parts by weight being expressed without taking the solvent into account. The mixing of these compounds is carried out at room temperature. The oxygenated detergent, essentially prepared according to the method of Example O-2, is the hydrolysis product of a polyisobutylene succinic anhydride derived from maleic anhydride and from polyisobutylene with a high vinylidene content with a number average molecular mass of 1,000.

Example 3C

A detergent composition is prepared according to the procedure of Example 3A, except that the quaternized polyester amide salt is prepared according to Example Q-2. The prepared detergent composition contains about 75% by weight of detergent based on a quaternized polyester amide salt.

Example 3D

A detergent composition is prepared according to the procedure 3B, except that the quaternary polyester amide salt is prepared according to Example 3C.

Example 4

Synthesis of Compositions of Additives Containing a Dispersion of Iron Particles and a Detergent Composition Based on Quaternized Polyester Amide Salt Three additives consisting of a mixture of one of the 3 iron particle dispersions of Example 1 (dispersions 1A, 1B or 1C) and of the detergent composition of Example 3A, respectively, are prepared by mixing at room temperature each element in controlled proportions so as to obtain an additive containing 5.56% by weight of iron metal.

The mixing is carried out with stirring at 120 revolutions/minutes. The mixing conditions are contained for 30 minutes and the quality of the mixture is monitored by measuring with X Fluorescence that the iron content in the top and in the bottom of the mixture is identical.

The mixtures 4A, 4B and 4C are thereby obtained.

Example 5

Flow Properties of the Additives

The flow property of the additive 4C are evaluated by means of a Kinexus rheometer from Malvern Instrument and compared with those of the additive C of WO 2010/150040.

The measurements were carried out in a Cone-plate system (Cone: 1°/50 mm and Plate: 65 mm) and over a shearing range from 0.1 to 1,000 s$^{-1}$.

The Newtonian viscosity values provided in Table 3 show that for temperatures of 20° C. and 40° C., the additive 4C is less viscose than the additive C of WO 2010/150040.

TABLE 3

Newtonian viscosity of the additives

|  | Additive 4C | Additive C Example 3 of WO 2010/150040 |
|---|---|---|
| 20° C. | 44 cP | 47 cP |
| 40° C. | 20 cP | 25 cP |

Example 6

Stability of the Colloidal Suspension in Fuels, Notably Containing Biofuels

Description of the Fuels Used:

Two fuels were used for this study: a fuel meeting the EN590 standard, marketed by British Petroleum (BP) under the name of BP Ultimate and a test fuel of the B10 type containing about 11% of biofuel.

Table 4 gives the main characteristics of the fuel B10. This fuel contains 10.8% by volume of biofuels in the form of fatty acid methyl ester (dosage according to the EN14078 standard, based on a dosage by infra-red spectroscopy of the content of fatty acid methyl esters (FAME)) while the fuel BP Ultimate contains 7% by volume of them (cf. Table 5)

TABLE 4

Main characteristics of the B10 fuel

| Fuel | | B10 |
|---|---|---|
| Composition | | |
| Aromatic | % mass | 24 |
| Polyaromatic | % mass | 4 |
| FAME | % volume/volume | 10.8 |
| Sulfur | mg/kg | 5 |
| Carbon residue (on the 10% distillation residue) | % mass/% mass | <0.2 |
| Copper | mg/kg | 0 |
| Zinc | mg/kg | 0 |

TABLE 5

FAME content in the fuels used
(dosage according to the EN14078 standard)

|  | % v/v EMAG |
|---|---|
| BP Ultimate | 7.0 |
| B10 | 10.8 |

Procedure for Testing Stability of Iron Colloidal Suspensions in Gasoils:

For each of the fuels, a specific amount of additive 1C (non-compliant with the invention) or 4C (compliant with the invention) is added to 250 mL of fuel.

Additive 1C, 14.8 mg
Additive 4C, 26.6 mg

This gives the possibility of having after homogenization, 4 additived fuels in an amount of 7 ppm by weight of iron and optionally of detergent in the weight proportions of the additive used for the 4C additives.

The test consists of heating the additived fuel to 70° C. for several days and of tracking the time-dependent change in the iron content in this fuel versus the heating time. A volume of 20 mL of fuel is sampled in the supernatant area, is filtered on a 0.2 μm filter and then the iron content of the filtrate is measured by X fluorescence analysis. It is considered that the colloidal suspension is stable as long as the iron content in the fuel is not reduced by more than 10%.

TABLE 6

Stability period (in days) for the additives in fuels.

|  | + additive 1C | + additive 4C |
|---|---|---|
| BP Ultimate | 18 days | >50 days* |
| B10 | 1 day | 13 days |

*the test was stopped for 50 days which allows demonstration of a stability of more than 50 days.

It is seen that regardless of the fuel, the stability period of the additive 4C, compliant with the invention, is higher than that of the additive 1C, non-compliant with the invention, which does not contain any detergent.

Example 7

Oxidation Resistance of the Gasoil in the Presence of an Additive

The oxidation resistance of two fuels from Example 6 was measured with and without additivation of each of the two additives 1C and 4C. The test consists of bubbling air in the fuel maintained at 110° C. and of tracking its degradation by quantification of the light acids formed during the test.

The ageing is carried out according to the EN 15751 standard from 2009 (Rancimat test).

Briefly, this method consists of sending an air flow onto a gasoil sample placed in a reaction cell brought to a temperature. Under the effect of the temperature and of the air oxygen there is oxidation. The oxidation products are carried away by the air flow towards a measurement cell where they are dissolved in a measurement solution (demineralized water). This measurement cell is equipped with an electrode which continuously records the conductivity of the measurement solution versus time. A sudden increase in the conductivity (an inflection point of the conductivity curve) determines the induction time.

Table 7 indicates that the degradation of the fuel, measured by the induction time, is reduced when the additive 4C, containing the detergent is used since the induction time is greater than the one measured with the additive 1C, which is non-compliant.

TABLE 7

Induction time (in hours) of the different additived fuels

|  | + additive 1C | + additive 4C |
|---|---|---|
| BP Ultimate | 30.4 | 37.3 |
| B10 | 30.2 | 36.9 |

Example 8

Engine Test of the Regeneration Efficiency for the Particle Filter

A diesel engine provided by the Volkswagen group (4 cylinders, 2 liters, turbocompressor with air cooling, 81 kW)

was used on an engine test bench. The exhaust line mounted downstream is a commercial line consisting of an oxidation catalyst containing a washcoat based on platinum and alumina followed by a commercial catalyzed particle filter (noted as CSF below) containing a washcoat based on platinum and alumina (total volume of the filter 3 L).

The fuel used is a commercial fuel meeting the EN590 DIN 51628 standard, containing less than 10 ppm of sulfur and containing 7% by volume of FAME or Fatty Acid Methyl Ester.

Depending on the case, the fuel is either additived with the additive 4C or not (counter-example). In the case when the fuel is additived, the fuel is additived with the amount of 4C additive with which it is possible to attain various iron metal contents expressed as ppm by mass relatively to the mass of the fuel. The iron content of the additived fuel is directly monitored by the X fluorescence technique on the organic liquid.

The test is conducted in two successive steps: a step for loading the CSF, followed by a step for regenerating the latter. The conditions of both of these steps are strictly identical for the various tests, except for the fuel used (either additived or not).

The loading phase is carried out by running the engine at a speed of 3,000 revolutions/min (rpm) and by using a torque of 45 Nm for approximately 6 hours. This loading phase is stopped when 12 g of particles (or soots) are loaded in the CSF. During this phase, the temperature of the gases upstream from the CSF is from 230 to 235° C. Under these conditions, the emissions of particles are of about 2 g/h.

After this loading phase, the CSF is disassembled and weighed in order to check the mass of particles loaded during this phase.

The PF is then reassembled on the bench and heated up with the engine which is put back for 30 minutes under the operating conditions of the loading (3,000 rpm/45 Nm). The conditions of the engine are then modified (torque 80 Nm/2,000 rpm) and post-injection is driven by the electronic central unit of the engine (ECU), which allows a rise in temperature upstream from the CSF to 500° C. and starting its regeneration. These conditions are maintained for 60 minutes, this time being counted from the starting of the post-injection.

The CSF regeneration efficiency is measured through two parameters:
the mass of soots burnt during the regeneration, calculated from the weighings of the CSF before loading (Mo), after loading (Mc) and at the end of regeneration (Mr). The % of burned soots after 60 minutes of regeneration is expressed in the following way: total % of burnt soots=((Mc−Mr)/(Mc−Mo))*100,
the mass of burnt soots at each instant t of the regeneration calculated from the time-dependent change of the load loss of the CSF at each instant DPt considering that the load loss at the beginning of the regeneration (DPc) corresponds to that of the CSF loaded with the mass of soots (Mc−Mo) and the load loss after 60 minutes (DPr) corresponds to that of the CSF loaded with the soots which have not burnt (Mr−Mo).

% of burnt soots (t)=((DPc−DPt)/(DPc−DPr))*total % of burnt soots

Generally, the higher these parameters, the more efficient is the regeneration.

A reference test (non-compliant with the invention) was conducted by using the non-additived fuel (Test 1) during the loading of the CSF and its regeneration.

Two tests (compliant with the invention) were conducted by using an additived fuel with an amount of additive with which it is possible to reach an iron content in the fuel of 3 ppm (Test 2) or 5 ppm (Test 3) of iron.

Table 8 compares the results obtained during the regeneration of the CSF by expressing the total % of burnt soots, i.e. at the end of the regeneration period (1 hour) or at the beginning of the regeneration (20 minutes).

TABLE 8

Results of engine tests for regeneration of the CSF using various fuels.

| Test No. | ppm of Fe | total % of burn soots after 1 hr | % of burnt soots after 20 mins |
|---|---|---|---|
| 1 | Non additived | 60 | 39 |
| 2 | 3 | 87 | 86 |
| 3 | 5 | 90 | 88 |

First of all it is seen that the addition of the composition 4C to the fuel (Test 2 and 3) gives the possibility of considerably increasing the efficiency of the regeneration since the latter is quasi-complete (86 to 88% of burnt soots) after 20 minutes at 500° C., the iron concentration (3 to 5 ppm) has little impact on the regeneration.

Conversely, when a non-additive fuel is used (Test 1), regeneration is not total (60% after 1 hour) and it is also much slower (39% of regeneration after 20 minutes).

The invention claimed is:

1. A composition comprising a dispersion and a detergent comprising a polyester quaternary ammonium salt, said dispersion comprising:
    an organic phase;
    at least one amphiphilic agent, and
    particles dispersed in the organic phase, with colloidal dimensions, consisting of an iron compound.

2. The composition according to claim 1, further comprising an oxygenated detergent additive.

3. The composition according to claim 1, wherein the polyester quaternary ammonium salt comprises the reaction product of:
    (a) a polyester containing a tertiary amine group, comprising the reaction product of a carboxylic fatty acid containing at least one hydroxyl group and a compound having an oxygen or nitrogen atom capable of condensing with said acid and further having a tertiary amine group; and
    (b) a quaternizing agent suitable for converting the tertiary amine group into a quaternary nitrogen, said agent being selected from the group formed by dialkyl sulfates, benzyl halides, carbonates with hydrocarbyl substitution, hydrocarbyl epoxides in combination with an acid or mixtures thereof.

4. The composition according to claim 3, wherein the carboxylic fatty acid is represented by the formula (I):

wherein $R^1$ is a hydrogen or a hydrocarbyl group containing from 1 to 20 carbon atoms, and $R^2$ is a hydrocarbylene group containing from 1 to 20 carbon atoms, and wherein the compound having an oxygen or nitrogen atom capable of condensing with said acid and further having a tertiary amine group is represented by the formula (II):

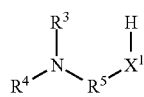

(II)

wherein $R^3$ is a hydrocarbyl group containing from 1 to 10 carbon atoms; $R^4$ is a hydrocarbyl group containing from 1 to 10 carbon atoms; $R^5$ is a hydrocarbylene group containing from 1 to 20 carbon atoms; and $X^1$ is O or $NR^6$ wherein $R^6$ is hydrogen or a hydrocarbyl group containing from 1 to 10 carbon atoms.

5. The composition according to claim 3, wherein the carboxylic fatty acid is selected from 12-hydroxystearic acid, ricinoleic acid, 12-hydroxydodecanoic acid, 5-hydroxydodecanoic acid, 5-hydroxydecanoic acid, 4-hydroxydecanoic acid, 10-hydroxyundecanoic acid, or combinations thereof; and wherein the compound having an oxygen or nitrogen atom capable of condensing with said acid and further having a tertiary amine group is selected from N,N-diethylethylenediamine, N,N-dimethylethylenediamine, N,N-dibutyl-ethylenediamine, N,N-dimethyl-1,3-diaminopropane, N,N-diethyl-1,3-diaminopropane, N,N-dimethylaminoethanol, N,N-diethylaminoethanol, or combinations thereof.

6. The composition according to claim 1, wherein the polyester quaternary ammonium salt comprises a quaternized polyester amide salt, wherein the polyester containing a tertiary amine group used for preparing the polyester quaternary ammonium salt is a polyester amide containing a tertiary amine group.

7. The composition according to claim 6, wherein the quaternary polyester amide salt comprises a cation represented by the formula (III):

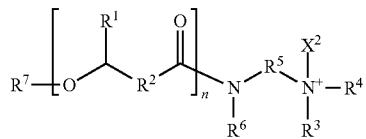

(III)

wherein $R^1$ is hydrogen or a hydrocarbyl group containing from 1 to 20 carbon atoms and $R^2$ is a hydrocarbylene group containing from 1 to 20 carbon atoms;
$R^3$ is a hydrocarbyl group containing from 1 to 10 carbon atoms;
$R^4$ is a hydrocarbyl group containing from 1 to 10 carbon atoms;
$R^5$ is a hydrocarbylene group containing from 1 to 20 carbon atoms;
$R^6$ is a hydrogen or a hydrocarbyl group containing from 1 to 10 carbon atoms; n is a number ranging from 2 to 10;
$R^7$ is a hydrogen, a hydrocarbonyl group containing from 1 to 22 carbon atoms, or a hydrocarbyl group containing from 1 to 22 carbon atoms; and
$X^2$ is a group derived from the quaternizing agent.

8. The composition according to claim 2, wherein the oxygenated detergent additive is a polyisobutylene compound including a succinic anhydride or succinic acid head group.

9. The composition according to claim 1, wherein the dispersion comprises particles consisting of an iron compound in amorphous form.

10. The composition according to claim 9, wherein at least 85% of the particles dispersed in the organic phase are individualized particles.

11. The composition according to claim 9, wherein the particles of the dispersion have a number median diameter measured by transmission electron microscopy $\Phi_{50}$ comprised between 1 nm and 5 nm.

12. The composition according to claim 1, wherein the dispersion comprises particles consisting of an iron compound in crystallized form.

13. The composition according to claim 1, wherein the organic phase of the dispersion is based on an apolar hydrocarbon.

14. The composition according to claim 1, wherein the amphiphilic agent is a carboxylic acid which generally includes from 10 to 50 carbon atoms.

15. The composition according to claim 12, wherein the average size $\overline{D}_{XRD}$ of the particles consisting of an iron compound in crystallized form, measured by X-ray diffraction, is less than or equal to 12 nm.

16. The composition according to claim 12, wherein at least 80% by number of the particles have a size $D_{TEM}$ of less than or equal to 12 nm as measured by transmission microscopy.

17. The composition according to claim 12, wherein the particles have a number median diameter $\Phi_{50}$ as measured by transmission electron microscopy comprised between 3 nm and 12 nm.

18. The composition according to claim 12, wherein the particles have a hydrodynamic diameter $D_h$ of less than or equal to 50 nm, as measured by dynamic light scattering.

19. The composition according to claim 1, wherein the iron content is comprised between 0.05% and 25%, this concentration being expressed in weight % of iron metal based on the total weight of said composition.

20. The composition according to claim 1, further comprising a deactivator of metals, a detergent/dispersant different from the detergent comprising a polyester quaternary ammonium salt, an antioxidant, a corrosion inhibitor, a foam inhibitor and/or an anti-foam agent, a de-emulsifier, a cold flow improver agent, a lubricating agent, an additive against valve seat recession, or combinations thereof.

21. A fuel additive for internal combustion engines consisting of a composition according to claim 1.

22. An additived fuel comprising a fuel and a composition according to claim 1.

23. The additived fuel according to claim 22, wherein the fuel is selected from the group consisting of gasoils and biofuels.

24. The additived fuel according to claim 22, wherein the iron mass content is comprised from 1 to 50 ppm of iron metal based on the total mass of the fuel.

25. A method for applying an internal combustion engine comprising a step for delivering to said engine a fuel and a composition according to claim 1.

26. The composition according to claim 6, wherein the quaternary polyester amide salt comprises a cation represented by the formula (III):

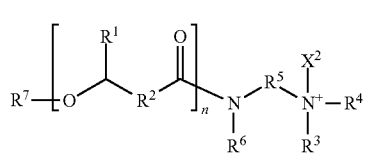
(III)

wherein $R^1$ is hydrogen or a hydrocarbyl group containing from 1 to 20 carbon atoms and $R^2$ is a hydrocarbylene group containing from 1 to 20 carbon atoms;

$R^3$ is a hydrocarbyl group containing from 1 to 10 carbon atoms;

$R^4$ is a hydrocarbyl group containing from 1 to 10 carbon atoms;

$R^5$ is a hydrocarbylene group containing from 1 to 20 carbon atoms;

$R^6$ is a hydrogen or a hydrocarbyl group containing from 1 to 10 carbon atoms; n is a number ranging from 3 to 10;

$R^7$ is a hydrogen, a hydrocarbonyl group containing from 1 to 22 carbon atoms, or a hydrocarbyl group containing from 1 to 22 carbon atoms; and $X^2$ is a group derived from the quaternizing agent.

* * * * *